US007027140B2

(12) United States Patent
Slocum et al.

(10) Patent No.: US 7,027,140 B2
(45) Date of Patent: Apr. 11, 2006

(54) MONITOR CALIBRATOR

(75) Inventors: David Slocum, Yardley, PA (US); Cormic K. Merle, Rochester, NY (US)

(73) Assignee: Colorvision Administrative AG, Lucerne (CH)

(*) Notice: Subject to any disclaimer, the term of this patent is extended or adjusted under 35 U.S.C. 154(b) by 294 days.

(21) Appl. No.: 10/023,621

(22) Filed: Dec. 18, 2001

(65) Prior Publication Data

US 2002/0085197 A1 Jul. 4, 2002

Related U.S. Application Data

(60) Provisional application No. 60/256,552, filed on Dec. 18, 2000.

(51) Int. Cl.
*G01J 1/42* (2006.01)
*G01J 3/46* (2006.01)

(52) U.S. Cl. ........................ 356/220; 356/402; 356/405; 356/419; 250/226

(58) Field of Classification Search ................ 356/402, 356/405, 419, 406, 407, 416, 218, 219, 220; 250/226, 239; 348/184, 191, 180, 181, 189, 348/190; 248/177.1, 165, 415, 425
See application file for complete search history.

(56) References Cited

U.S. PATENT DOCUMENTS

| | | | | | |
|---|---|---|---|---|---|
| 4,562,983 | A | * | 1/1986 | Klefbeck | 248/97 |
| 5,270,540 | A | * | 12/1993 | Skop et al. | 250/239 |
| 5,371,537 | A | * | 12/1994 | Bohan et al. | 348/181 |
| 5,940,350 | A | * | 8/1999 | Booty, Jr. | 368/276 |
| 6,067,166 | A | * | 5/2000 | Fox et al. | 356/402 |
| D432,516 | S | * | 10/2000 | Chen | D14/170 |
| 6,163,377 | A | * | 12/2000 | Boles et al. | 356/402 |
| 6,296,426 | B1 | * | 10/2001 | King et al. | 408/76 |

* cited by examiner

*Primary Examiner*—Hoa Q. Pham
(74) *Attorney, Agent, or Firm*—Moser, Patterson & Sheridan, LLP; Kin-Wah Tong, Esq.

(57) ABSTRACT

A symmetric monitor calibrator for mounting on a cathode ray tube or monitor with a surface. The calibrator has a case that holds electronic and optic components. Suction cups hold the calibrator to the surface, in which the suction cups are attached to the end of supporting elements that surround the case. At least three supporting elements with a common connecting point to form one support structure are connected to the top of the case. The supporting elements extend out creating a greater diameter than the case. The supporting elements and therefore suction cups uniformly surround the center point of the case to prevent rotation caused by the effects of gravity.

31 Claims, 7 Drawing Sheets

MONITOR CALIBRATOR

CROSS REFERENCE TO RELATED APPLICATIONS

The present application claims benefit of U.S. Provisional Application No. 60/256,552 filed Dec. 18, 2000, the disclosure of which is incorporated by reference herein.

FIELD OF THE INVENTION

The present invention is directed to a monitor calibrator.

BACKGROUND

Prior art is represented by other monitor calibrators that lack stability when attached to the glass surface of a cathode ray tube (CRT) commonly used for computer monitors. The lack of stability is due to the way the device is attached to the monitor, and the cantilever effect that gravity has on the device once mounted.

One example cited is the Xrite DPT 92. The Xrite device uses a single large suction cup that is mounted on the device to attach to the glass surface of the monitor. Since the single large suction cup is offset from the true center of gravity of the device, the device and others designed similarly will have a tendency to droop or rotate downward due to the effect of gravity. This drooping action causes the light detector and related optics to rotate out of the plane of the CRT or monitor. Once the device rotates out of the plane of the monitor, the device may result in poor performance or unwanted error.

Another type of monitor calibrator known as the sequel device attempts to overcome the problem of drooping by attaching multiple suction cups on the mounting side of the device. In this case, the suction cups adhere to the monitor to try and improve stability, however, there is also some degree of droop or rotation. In the case of this design, the multiple suction cups are mounted to one side of the device, but the suction cups are still offset to the true center of gravity of the device, causing droop or rotation error. In addition to droop or rotation, this approach also results in adding a level of non-repeatability in measurement.

SUMMARY OF THE INVENTION

One embodiment of the invention is a monitor calibrator for mounting to a surface in order to reduce the effects of gravity on the calibrator. The calibrator has a case having a shape with a plurality of case supporting elements extending from the case uniformly distributed around a perimeter of the case.

DETAILED DESCRIPTION OF THE INVENTION

Figure 1:
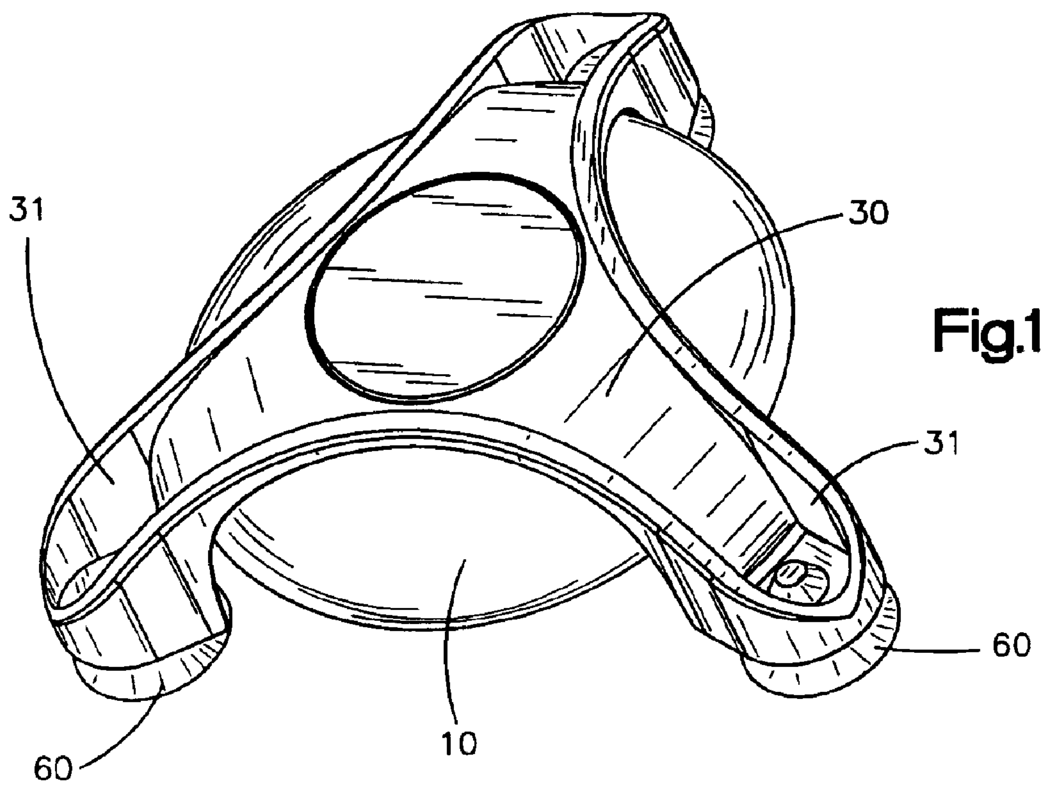
FIG. 1 is a perspective view of one embodiment of the present invention.
Figure 2:
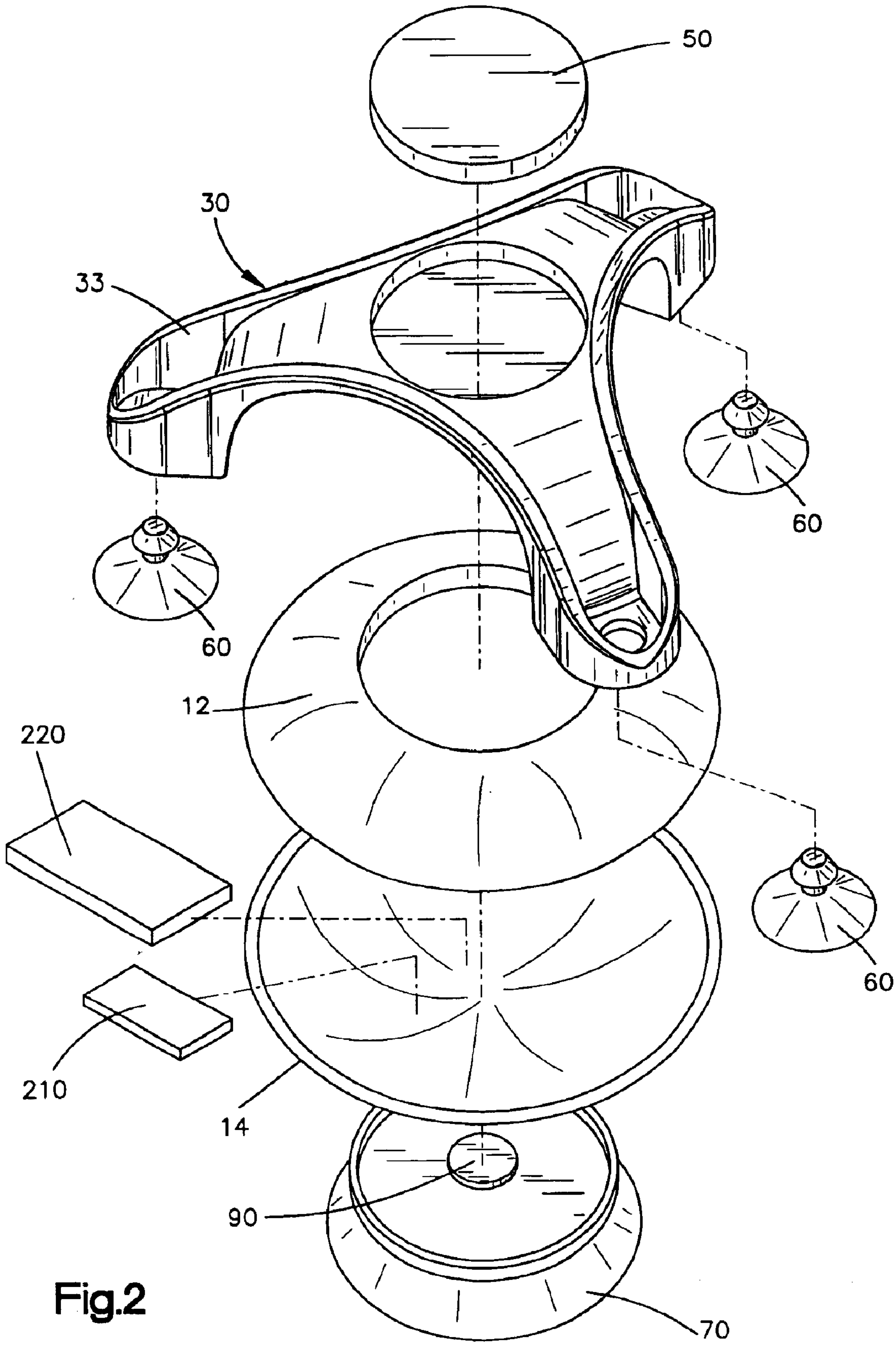
FIG. 2 is an exploded view of one embodiment of the present invention.
Figure 3:
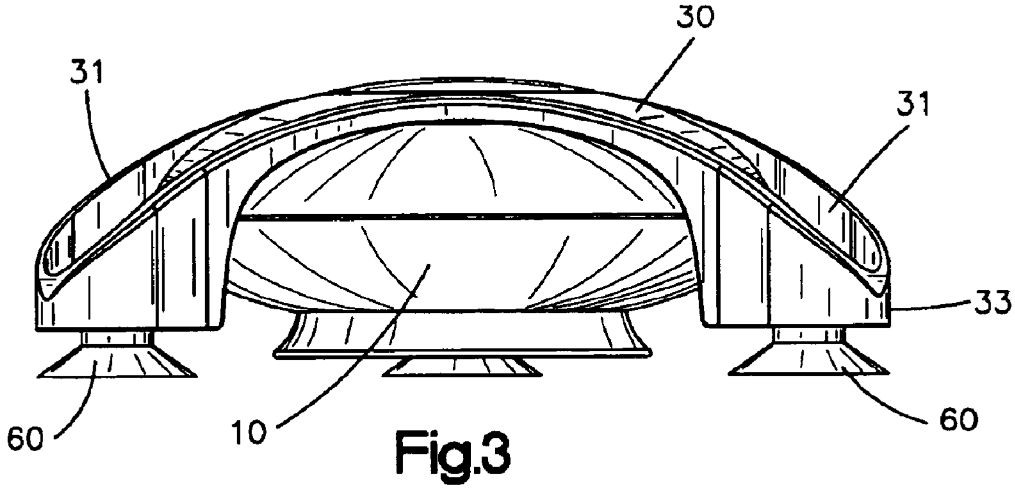
FIGS. 3–5 are side views of one embodiment of the present invention.
Figure 4:
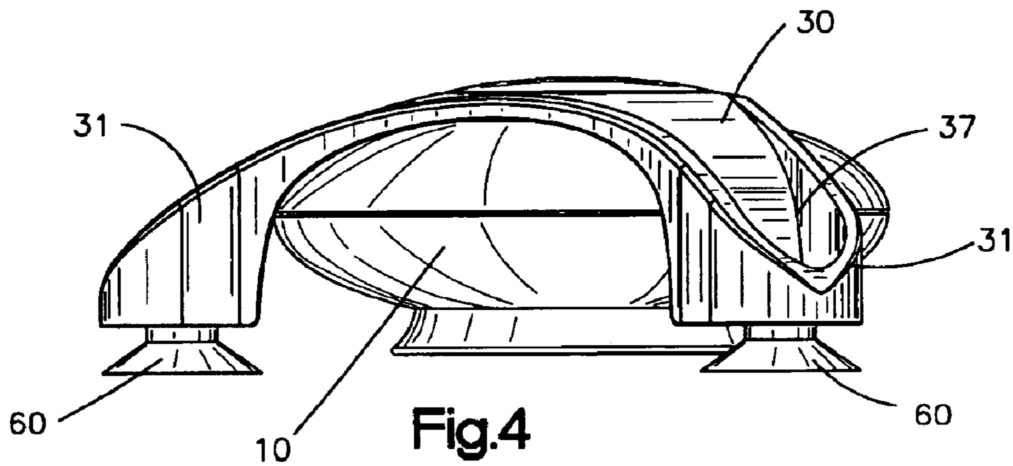
Figure 5:
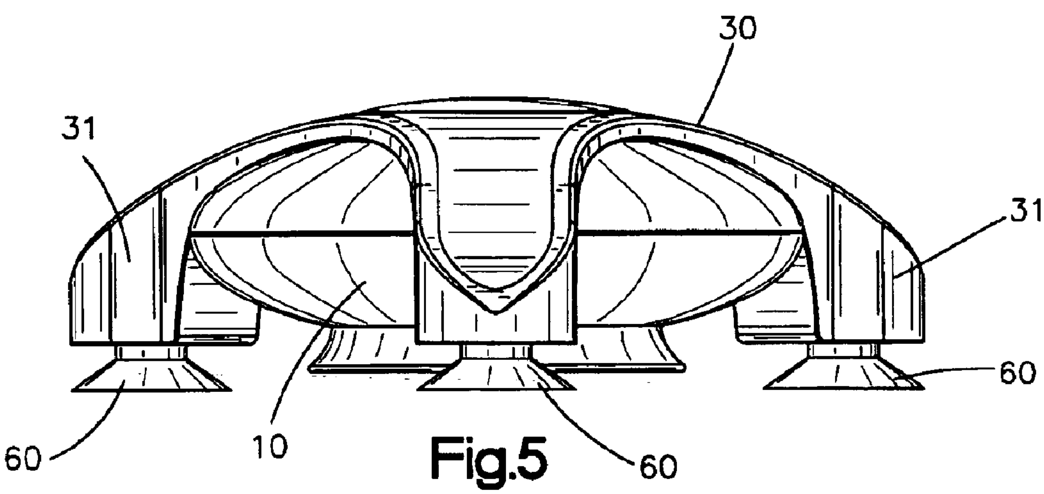
Figure 6:
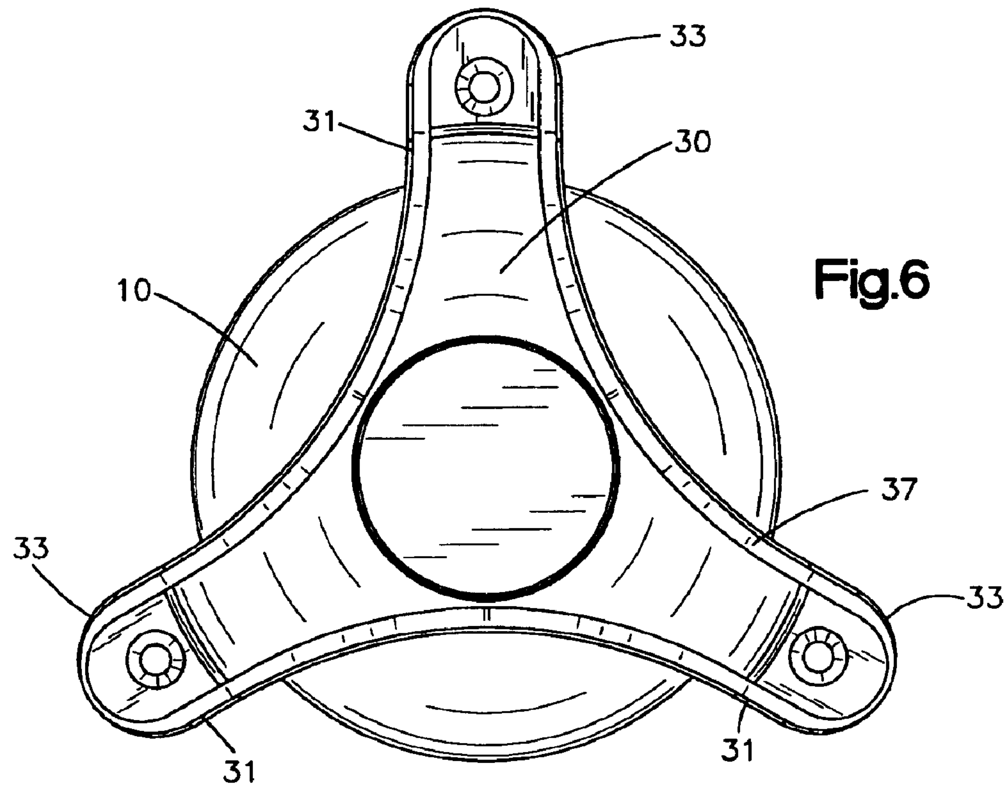
FIG. 6 is a top view of one embodiment of the present invention.
Figure 7:
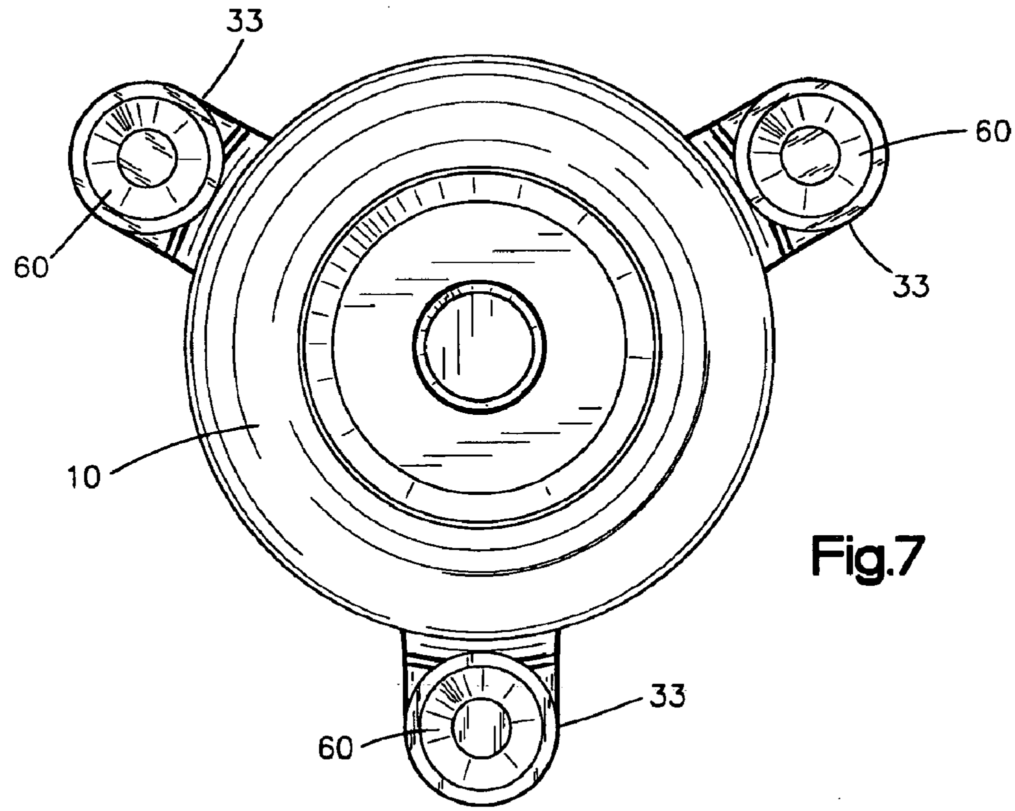
FIG. 7 is a bottom view of one embodiment of the present invention.

The invention will be described in reference to the drawings. FIG. 1 shows one embodiment of a monitor calibrator assembled and ready for use. FIG. 2 shows the exemplary structural elements of one embodiment of the monitor calibrator. Elements of the monitor calibrator 1 are a case 10 and a support structure 30.

Figure 8A:
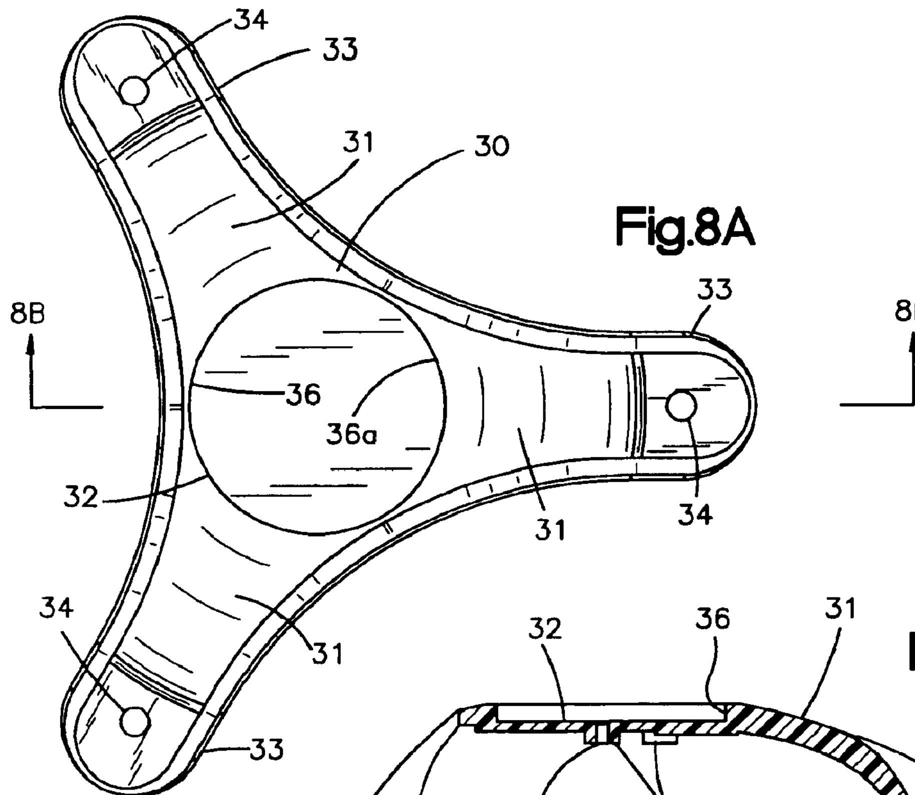
FIGS. 8A–C are top, sectional, and bottom views of one embodiment of the case supporting elements of the present invention.
Figure 8B:
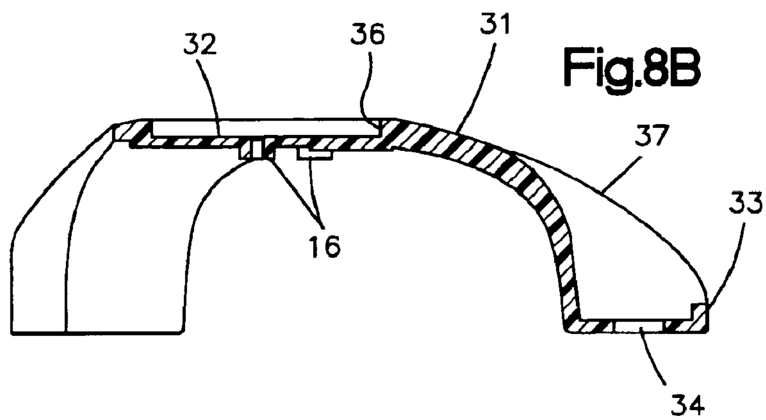
Figure 8C:
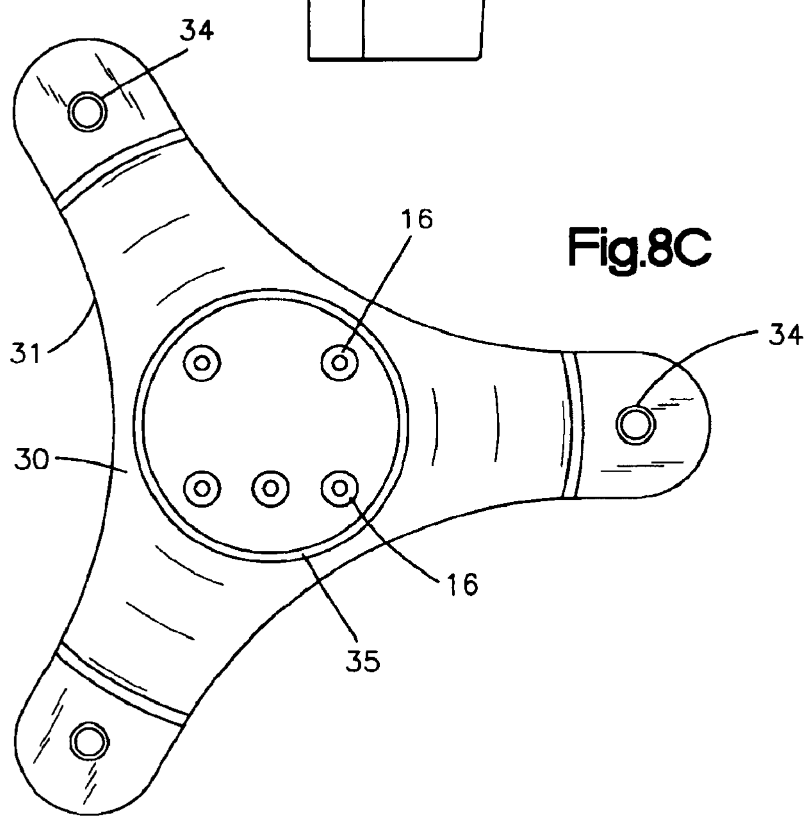
Figure 10:
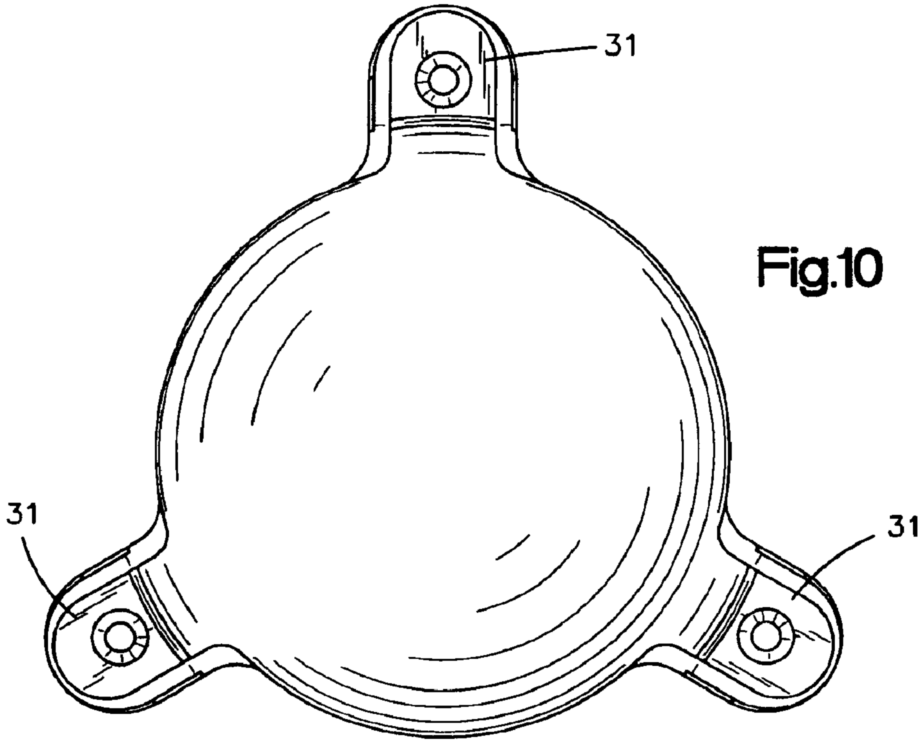
FIGS. 10 and 11 are top views of different embodiments of the present invention.
Figure 11:
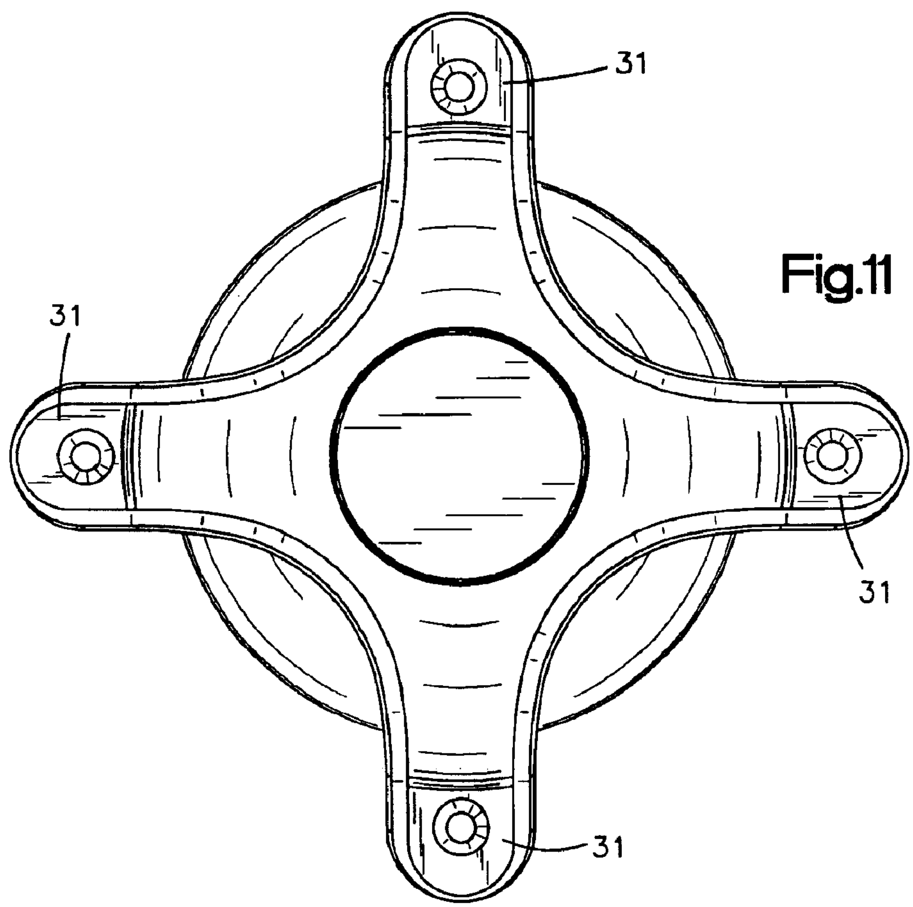

As shown in FIGS. 8A–C, the stability and support of the calibrator is created by the support structure 30 that has case supporting elements 31. One embodiment of the monitor calibrator 1 shows the support structure 30 with three case supporting elements 31. However, FIG. 11 shows another embodiment of the calibrator 1 with four case supporting elements 31. The case supporting elements 31 are symmetric with each other and protrude from the center of the support structure 30, which is the same center as the case 10. The protruding supporting elements 31 form a larger diameter than the case 10. One embodiment of the support structure 30 shows the support structure 30 to be a separate piece from the case 10, as shown in FIGS. 3–7. Another embodiment of the support structure is shown as an integral part of the case 10 in FIG. 10. Each case supporting element 31 cross section is formed as a plastic injected "C" channel 37, shown in FIG. 4 and FIG. 8B, so that it forms a stiff spring like structure.

The three case supporting elements 31 form a single triangular structure where each case supporting element 31 is equal distance to one another. This triangular shape provides stability to the support structure 30 since the case supporting elements 31 surround the center of the structure 30 and the case 10.

The top of the support structure 30 may have a cavity 32 surrounding the center of the support structure 30. The underneath 35 of the cavity 32 contains a fastening means, such as multiple female fasteners 16. On the top of the top half 12 of the case 10 there are fastening means, such as male fasteners 15, shown in FIG. 9A. The fasteners are primarily for securing the support structure 30 to the case 10. In addition, the cavity 32 contains a fastening means for securing a cap 50 with a logo of the product to the support structure 30.

Figure 9A:
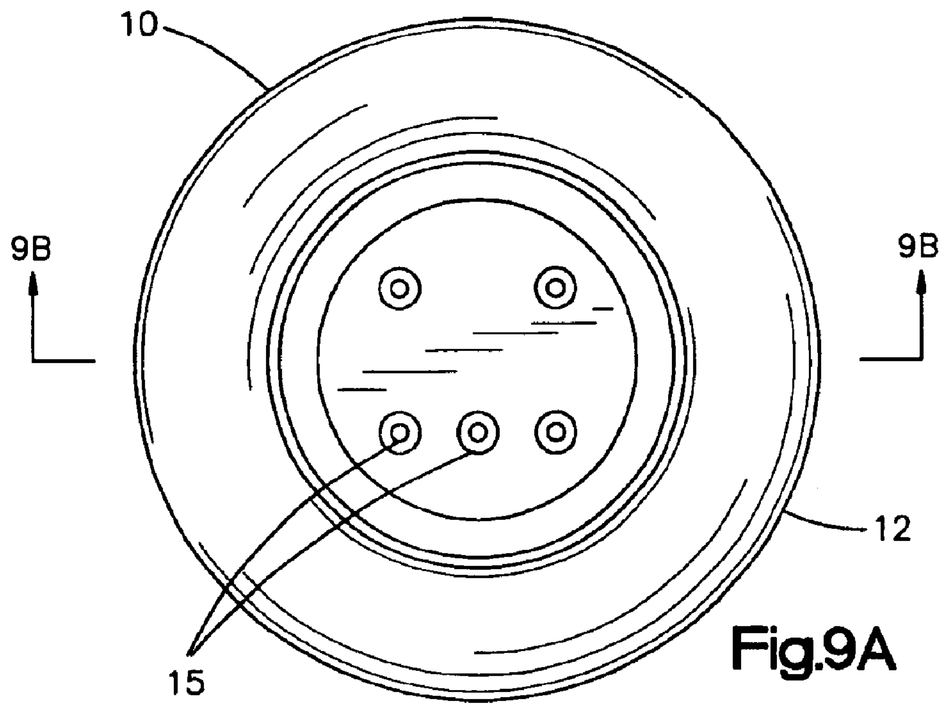
FIGS. 9A–C are top, sectional, and side views of one embodiment the part of the case of the present invention.
Figure 9B:
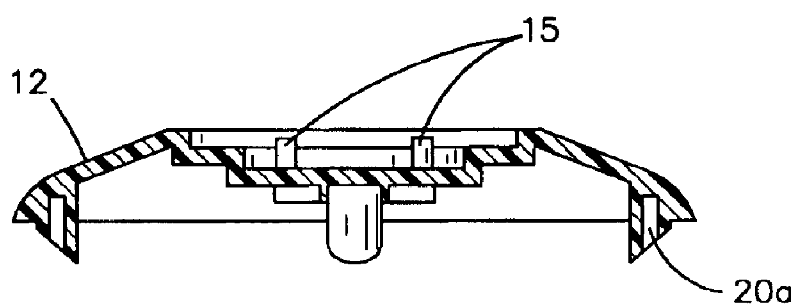
Figure 9C:
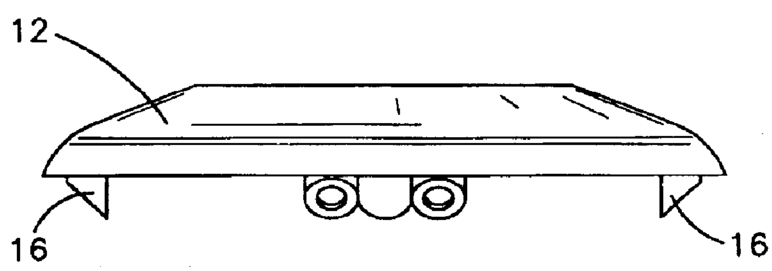

As shown in FIG. 2, one embodiment of the housing component of the invention, referred to as the case 10, is designed as a symmetric two piece puck with a top half 12, shown in FIGS. 9A–C, and a bottom half 14, shown in FIG. 2. The two halves resemble hemispheres that join together by fastening means, such as male and female components and a ridge and groove combination 20*a*. The two halves are hollow inside to store electronic and optic components, 210 and 220, respectively, of the invention. Reference is made to U.S. Patent No. 6,163,377, incorporated by reference herein, issued on Dec.19, 2000 and assigned to the present assignee, describing exemplary electronics and optics.

As shown in FIG. 2, suction cups 60 are preferably used as a supporting means to mount the calibrator 1 to a surface (e.g., a substantially vertical surface). It is to be understood that a torque produced by the weight of the electronic and optic components is substantially supported by the case 10. Furthermore, it is to be understood that a moment-arm of a torque of the case 10 is less than a moment-arm of a torque of the case supporting elements 31 relative to a center of gravity of the case 10, the electronic and optic components, and the support structure 30. Each case supporting element 31 has an aperture 34 through a foot 33 of the case supporting element 31 to hold the suction cup 60.

As shown in FIG. 2, a light shield 70 is an optional feature to attach to the bottom of the calibrator 1. On the top of the shield 70 is a fastening means for attachment with the case 10 in combination with the fastening means on the bottom of the case 10. The light shield's 70 main purpose is to prevent any unnecessary outside light which would cause the calibrator to misread a value.

As shown FIG. 2, a diffuser 90 may be secured to the bottom of the case by fastening means, such as semi-spherical locking fasteners, that correspond with fastening means, such as semi-spherical grooves, at the bottom of the case.

After the device 1 is completely assembled, the device 1 is able to be mounted on a monitor. Once attached to the monitor or CRT, the case supporting elements 31 compress the suction cups 60 against the surface. This compression pre-loads the case supporting elements 31. The energy caused by this pre-loading technique results in enough force that it minimizes the droop or roll experienced by other designs.

Although the present invention has been described in detail with reference to certain preferred embodiments thereof, other embodiments are possible. Therefore, the spirit and scope of the appended claims should not be limited to the description of the preferred embodiment contained herein.

What is claimed is:

1. A monitor calibrator for mounting to a surface in order to reduce the effects of gravity on said calibrator comprising:

a case having a shape, electronics for measuring a color content of light emitted from the surface being within the case; and a plurality of case supporting elements, extending over and radially outwardly from said case, uniformly distributed around a perimeter of said case.

2. The calibrator according to claim 1 wherein said case supporting elements are a separate support structure from said case.

3. The calibrator according to claim 1 wherein said case supporting elements are integral with said case.

4. The calibrator according to claim 1 comprising at least three case supporting elements.

5. The calibrator according to claim 1 wherein said case supporting elements comprise a cross section formed as a plastic injected "C" channel.

6. The calibrator according to claim 1 wherein said case supporting elements comprise a foot at an end of each supporting element.

7. The calibrator according to claim 6 wherein said foot comprises an aperture.

8. The calibrator according to claim 1 wherein said case supporting elements are equidistant from each element.

9. The calibrator according to claim 1 wherein an end of each case supporting element is attached to a supporting means.

10. The calibrator according to claim 9 wherein said supporting means is a suction cup.

11. The calibrator according to claim 1 wherein said case supporting elements join together at a cavity.

12. The calibrator according to claim 1 comprising a cap mounted to the top of said calibrator.

13. The calibrator according to claim 1 comprising a diffuser mounted to the bottom of said calibrator.

14. The calibrator according to claim 1 comprising a light shield mounted to the bottom of said calibrator.

15. The calibrator according to claim 1 wherein said case is one hollow piece.

16. The calibrator according to claim 1 wherein said case comprises two separate pieces, wherein said two pieces are a top half and a bottom half.

17. The calibrator according to claim 16 wherein said top half comprises a fastening means and said bottom half comprises a fastening means.

18. The calibrator according to claim 17 wherein said fastening means are male and female components.

19. The calibrator according to claim 17 wherein said fastening means are a ridge and a groove.

20. The calibrator according to claim 17 wherein said fastening means mate to join said top half and said bottom half.

21. The calibrator according to claim 1 wherein the top of the outer surface of said case comprises a fastening means.

22. The calibrator according to claim 21 wherein the bottom of said support structure comprises said fastening means.

23. The calibrator according to claim 22 wherein said support structure is mounted on the top of said case by mating said fastening means.

24. The calibrator according to claim 23 wherein said fastening means are male and female components.

25. The calibrator according to claim 1 wherein said case houses electronic and optic components.

26. A monitor calibrator for mounting to a surface comprising:

a case, electronics for measuring a color content of light emitted from the surface being secured within the case; and a plurality of case supporting elements extending from said case and uniformly distributed around a perimeter of said case, cross sections of the case supporting elements forming respective channels.

27. The calibrator according to claim 26, wherein the channels are "C" channels.

28. The calibrator according to claim 27, further including:

respective feet at the end of the case supporting elements.

29. The calibrator according to claim 26 wherein an end of each case supporting element is attached to respective supporting means.

30. The calibrator according to claim 29 wherein said supporting means is a suction cup.

31. A monitor calibrator for mounting to a surface in order to reduce the effects of gravity on said calibrator comprising:

a case having a shape, electronics for measuring color content of light emitted from the surface being secured within the case; and a plurality of case supporting elements, extending across said case and originating at a central point on the case, being substantially uniformly distributed around a perimeter of said case.

* * * * *